(12) United States Patent
Grishauge et al.

(10) Patent No.: US 11,280,319 B2
(45) Date of Patent: Mar. 22, 2022

(54) METHOD FOR ON-SITE REPAIRING OF A WIND TURBINE COMPONENT

(71) Applicant: Siemens Gamesa Renewable Energy A/S, Brande (DK)

(72) Inventors: Nikolai Bak Grishauge, Nibe (DK); Harald Stecher, Skørping (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 333 days.

(21) Appl. No.: 16/361,353

(22) Filed: Mar. 22, 2019

(65) Prior Publication Data

US 2019/0309733 A1 Oct. 10, 2019

(30) Foreign Application Priority Data

Apr. 5, 2018 (EP) .................................... 18165845

(51) Int. Cl.
*B29C 64/393* (2017.01)
*B29C 64/106* (2017.01)
(Continued)

(52) U.S. Cl.
CPC ............ *F03D 80/50* (2016.05); *B29C 64/106* (2017.08); *B29C 64/393* (2017.08); *B29C 73/00* (2013.01);
(Continued)

(58) Field of Classification Search
CPC .. F03D 80/50; F05B 2230/31; F05B 2230/80; F05B 2230/4007; B29C 73/02; B33Y 10/00; B33Y 50/02
See application file for complete search history.

(56) References Cited

U.S. PATENT DOCUMENTS 8,186,960 B2 * 5/2012 Dawson .................. F03D 80/50
416/204 R
2015/0233345 A1 8/2015 Olsen et al.
(Continued)

FOREIGN PATENT DOCUMENTS

CN 104736842 A 6/2015
CN 107460477 A 12/2017
(Continued)

OTHER PUBLICATIONS

European Search Report for Application No. 18165845.1, dated Oct. 10, 2018.
(Continued)

*Primary Examiner* — Michael P Wieczorek
(74) *Attorney, Agent, or Firm* — Schmeiser, Olsen & Watts LLP

(57) ABSTRACT

A method for on-site repairing of a surface of a component in a wind turbine is provided. In the method, a digital model of the surface is generated using a scanning device. The digital model represents the surface in damaged state. Thereafter, using a processor, a repair scheme for the surface based on the digital model and on a desired state of the surface is generated. The desired state represents a post-repair state of the surface. Consequently, the repair scheme is provided to a 3D printing arrangement. Finally, in the method, one or more selected materials are printed, using the 3D printing arrangement, on the surface to be repaired, wherein the printing is performed according the repair scheme and results in repair of the damaged surface.

6 Claims, 5 Drawing Sheets

Figure 1:
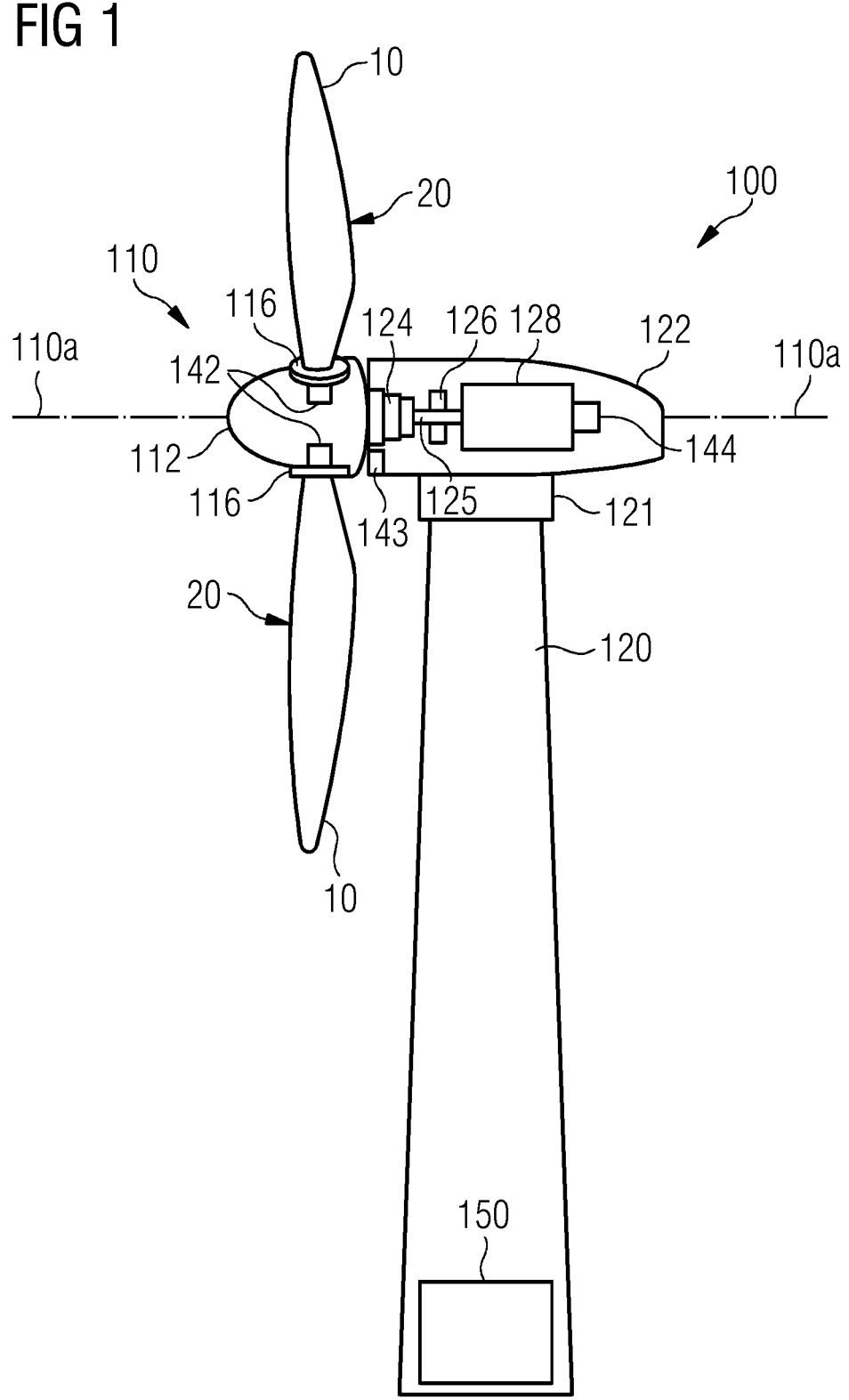

(51) Int. Cl.
    *B29C 73/00*     (2006.01)
    *B29C 73/02*     (2006.01)
    *G05B 19/4099*     (2006.01)
    *B33Y 10/00*     (2015.01)
    *B33Y 50/00*     (2015.01)
    *F03D 80/50*     (2016.01)
    *F03D 1/06*     (2006.01)
    *F03D 17/00*     (2016.01)
    *B33Y 50/02*     (2015.01)

(52) U.S. Cl.
CPC ............ *B29C 73/02* (2013.01); *F03D 1/0675* (2013.01); *F03D 17/00* (2016.05); *G05B 19/4099* (2013.01); *B33Y 10/00* (2014.12); *B33Y 50/02* (2014.12); *F05B 2230/31* (2013.01); *F05B 2230/80* (2013.01); *F05B 2260/80* (2013.01); *F05B 2280/4007* (2013.01)

(56) References Cited

U.S. PATENT DOCUMENTS

2016/0129638 A1     5/2016   Bostick et al.
2016/0159011 A1     6/2016   Marchione et al.
2017/0113799 A1     4/2017   Kovac et al.
2019/0338759 A1*  11/2019  Badger .................. B29C 73/02

FOREIGN PATENT DOCUMENTS

| | | |
|---|---|---|
| EP | 2497943 A1 | 9/2012 |
| EP | 2700811 A1 | 2/2014 |
| WO | 2016079535 A1 | 5/2016 |
| WO | 2018113875 A1 | 6/2018 |

OTHER PUBLICATIONS

Non-English Chinese Office Action for Application No. 201910270847.4, dated May 7, 2020.

\* cited by examiner

METHOD FOR ON-SITE REPAIRING OF A WIND TURBINE COMPONENT

CROSS-REFERENCE TO RELATED APPLICATIONS

This application claims priority to EP Application No. 18165845.1, having a filing date of Apr. 5, 2018, the entire contents of which are hereby incorporated by reference.

FIELD OF TECHNOLOGY

The following relates generally to repairing of wind turbine components, and in particular, to methods for on-site repairing of wind turbine components.

BACKGROUND

Nowadays several wind turbine components such as blades are made of fibre reinforced plastic composite materials. Erosion of the surface of the components and particularly of the leading edge of such wind turbine rotor blades is known to occur in operation. Erosion of the leading edge of a turbine blade may reduce the efficiency of the blade and thus the power output by the turbine.

Wind turbine rotor blades, both of offshore wind turbines and onshore wind turbines, are especially affected by wear which occurs when the blades are impacted by particles or droplets in the ambient wind resulting in degradation of the leading edge of the wind turbine rotor blade. The particles and droplets are present in the ambient wind and originate from dust, rain, snow-fall, etc and cause erosion of the leading edge of wind turbine blades by impingement wear resulting into reduction of the blade aerodynamic efficiency and thus the maximum output power of the wind turbine. The erosion also affects other parts of the blades for example shell surface of the blade besides from the leading edge.

Erosion on a turbine blade may penetrate the structural fibre reinforced laminate leading to severe failure of the turbine blade requiring repair which can be very costly to turbine operators and may involve considerable downtime for the affected wind turbine requiring dismantling and transportation of the affected component to a repair workshop. This holds especially true for offshore wind turbines because their maintenance costs are extremely high. Therefore, generally a surface system is foreseen on the leading edge of wind turbine rotor blades of onshore and offshore wind turbines.

Repair procedures typically include a re-establishment of the surface systems mostly comprising filler and paint. In case of severe degradation, a lamination may be required. Different solutions are used for protecting and/or repairing the leading edges of composite blades, including adhesive plastic tapes.

EP2497943 A1 discloses a wind turbine blade with an improved surface, wherein a plastic tape is arranged at specific locations of the blade to reinforce the blade surface. The life time of erosion protection tapes will last approximately between 5-8 years, depending on the environmental conditions of the location of the wind turbine, as well as the turbine operating conditions. In general, an erosion protection tape will rupture due to heavy erosion, causing the layer left on the rotor blade to freely flutter in the wind. This fluttering will result in a loss of aerodynamic performance of the blade, as well as in the generation of noise.

Other solutions suggest erosion protection coatings applied by brush, roller, spatula or spray can. Generally, such coatings have to be applied at a certain humidity level and within a special temperature window, e.g. 20 and 25 degree Celsius. Thus, these solutions may not be used in the field, e.g. at offshore wind farms or at wind turbine locations are that are generally cooler or hotter than the special temperature window.

The application of coating or protective tape or use of fillers has two major disadvantages besides others. Firstly, they all require the component to be brought to repair workshops for carrying out the repair. Secondly, the application of coating or tape or filler material is crude and leaves behind surface imperfections.

Further solutions suggest attaching a protective shell or shield made of a polymer material to the forefront of a wind turbine blade during manufacturing or installation of the blade, especially applied to the leading-edge section of the wind turbine rotor blade. The protective shell is intended to obviate erosion of the blade shell and suffer the erosion instead. However, the protective shell once eroded also requires repair or replacement. Repairing of the protective shell has the same two major disadvantages as aforementioned, whereas replacement is costly and time consuming. Furthermore, the protective shells are often in multiple small pieces that are combined on the blade producing joints that are sensitive.

SUMMARY

An aspect relates to provide a repair method for wind turbine components that can be performed on-site of wind turbine installation, that is precise and thus does not result in surface imperfections because of the repair, and that does not require replacement of the component.

In the present technique, a method for on-site repairing of a surface of a component in a wind turbine is presented. The method is performed at the wind turbine installation site without dismantling any of the components of the wind turbine.

In the method, a digital model of the surface of the component to be repaired is generated by using a scanning device, for example a 3D scanner. The digital model, i.e. a 3D data set, represents the surface in damaged state, i.e. maps one or more damages such as cracks or erosion sites, along with location of each such damage. The digital model is provided to a processor or is generated by the processor using the scanner data. Thereafter, using the processor, a repair scheme for the surface is generated. The repair scheme is based on the digital model and on a desired state of the surface of the component. The desired state represents a post-repair state of the surface of the component for example the desired state represents a native state i.e. a state of the component prior to damage such as at the time of installation. Another example of desired state is a modified state i.e. a state to which the surface of the component is to be shaped, different from the native state, for desired aerodynamic and/or mechanical properties of the component. The desired state may be predetermined using an external means such as an external processor and associated design algorithm. Alternatively, the desired state may be generated by the processor from the digital model and using shape correction algorithms and design models. The repair scheme thus generated by the processor includes information on which part or parts of the surface are to be repaired, and how much is each part to be repaired, or in other words where on the damaged surface a 3D print should be deposited and how much printing material, for example reactive materials or one or more thermoplastic materials, should be deposited at each such location. Thereafter in the method, the repair scheme, i.e. a set of instructions generated by the processor for a 3D printing arrangement, is provided to the 3D printing arrangement which is ideally equipped with a 3D printing head for depositing the print material and a positioning mechanism for locating the 3D printing head to different locations according to the repair scheme. The positioning mechanism may be user controlled or autonomous for example a robot or a cable drive. Thereafter in the method, the damaged surface of the component is printed with one or more selected materials, using the 3D printing arrangement and according the repair scheme. The depositions of the print material are at the damaged location and thus the damaged surface is repaired and transformed by way of 3D printing from damaged state to the desired state.

The aforementioned method according to the present technique has several advantages. First, since 3D printing is sensitive, very accurate shaping of the damaged surface can be achieved as compared to user operated machine tools. Second, the shape of the damaged surface may not only be restored but may also be modified to the desired state and thus allowing advantageous alterations of the shape of the component. Third, the method using autonomous positioning mechanism obviates partially or completely any human intervention or expertise requirements and thus making the method more robust and error-free. Lastly, the method is performed at the installation site of the wind turbine and does not require dismantling of the wind turbines, and thus reducing the downtime for the repair and maintenance operations.

In an embodiment of the method, the component to be repaired is a blade of the wind turbine. More particularly, the component is a leading edge of the blade of the wind turbine or is a protective shell attached to the leading edge. The method is also suitable for repairing other parts of the blade such as root section, trailing edge, etc. or hub of the wind turbine.

BRIEF DESCRIPTION

Figure 2:
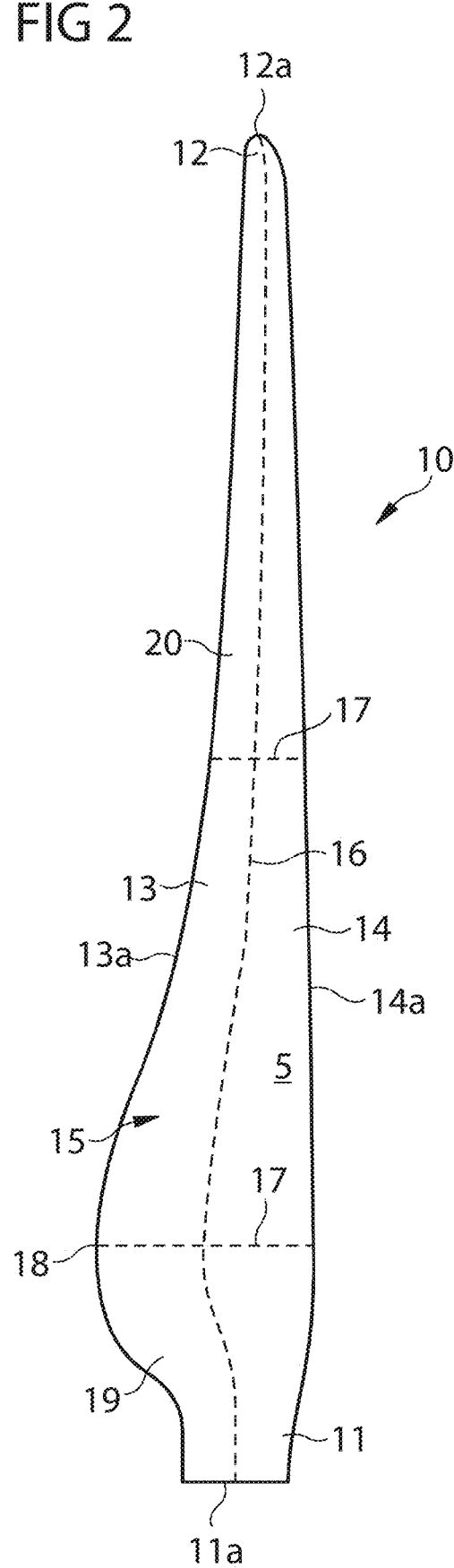
Figure 3:
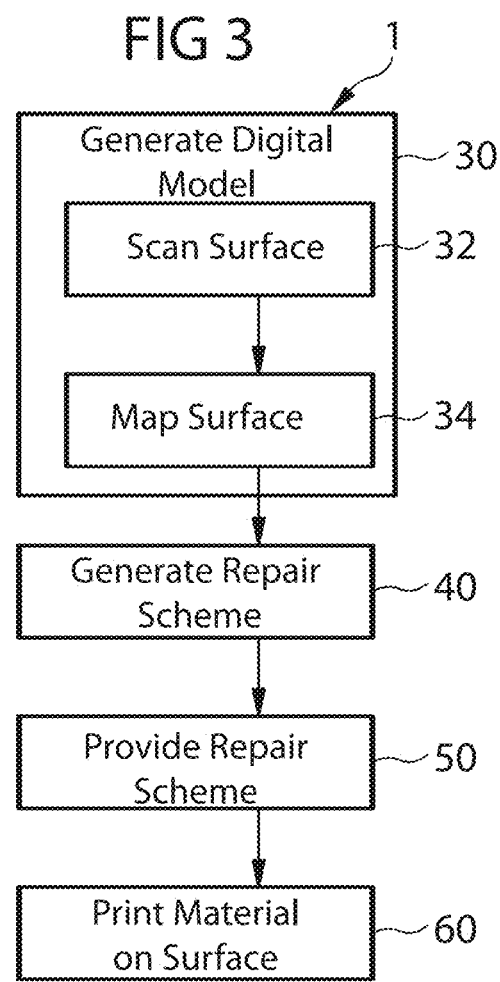
Figure 4:
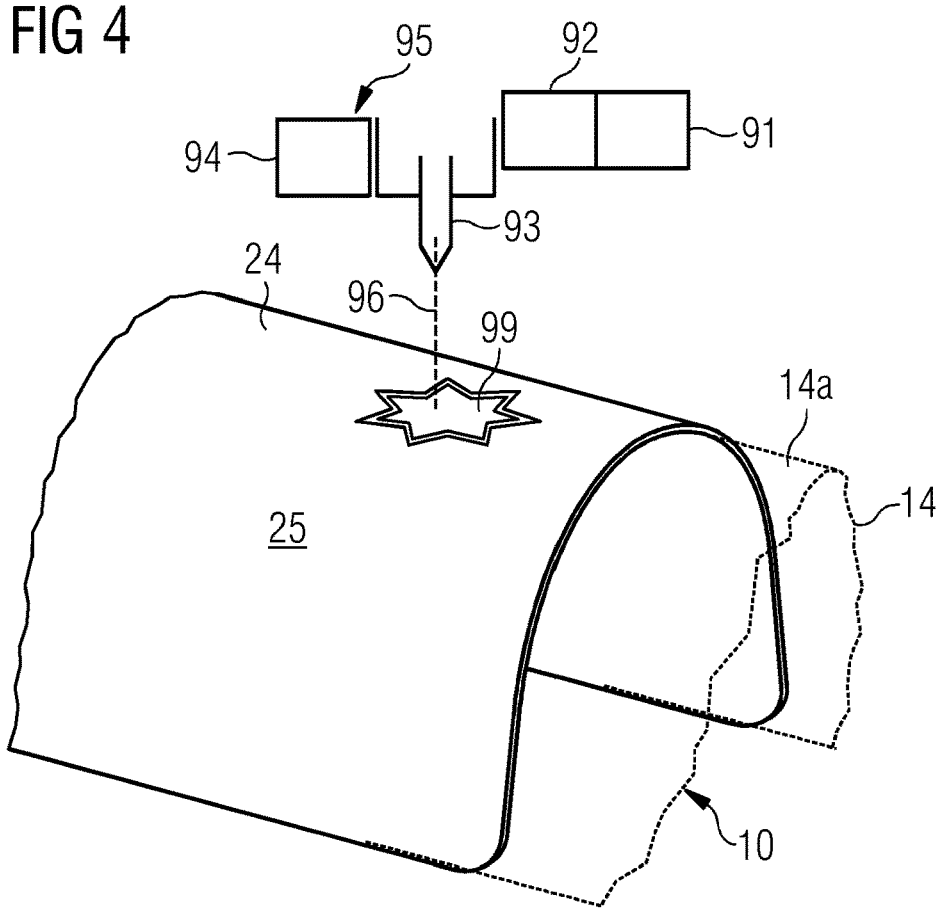
Figure 5:
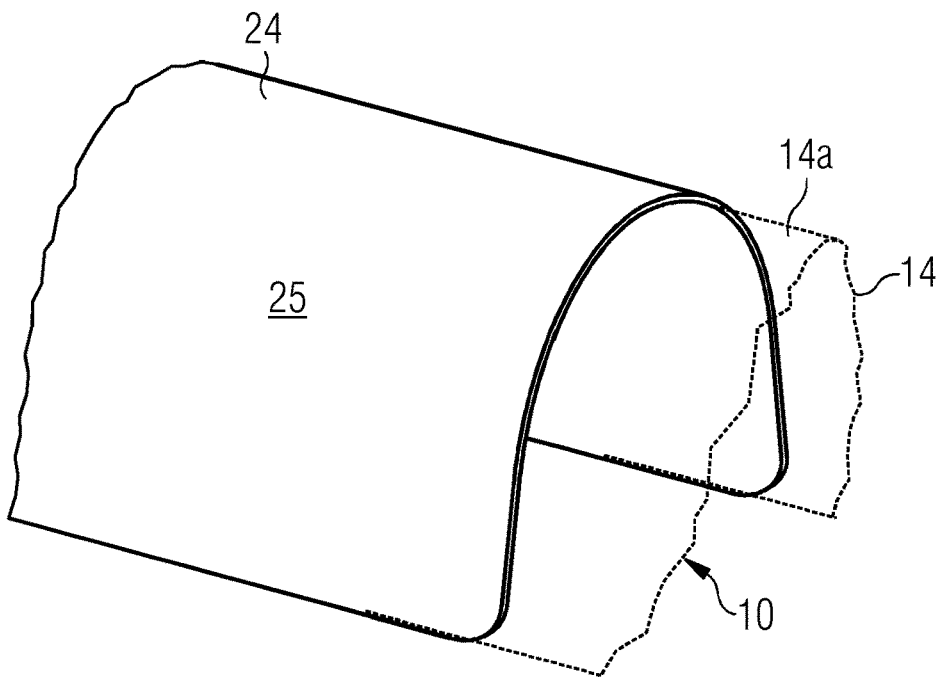
Figure 6:
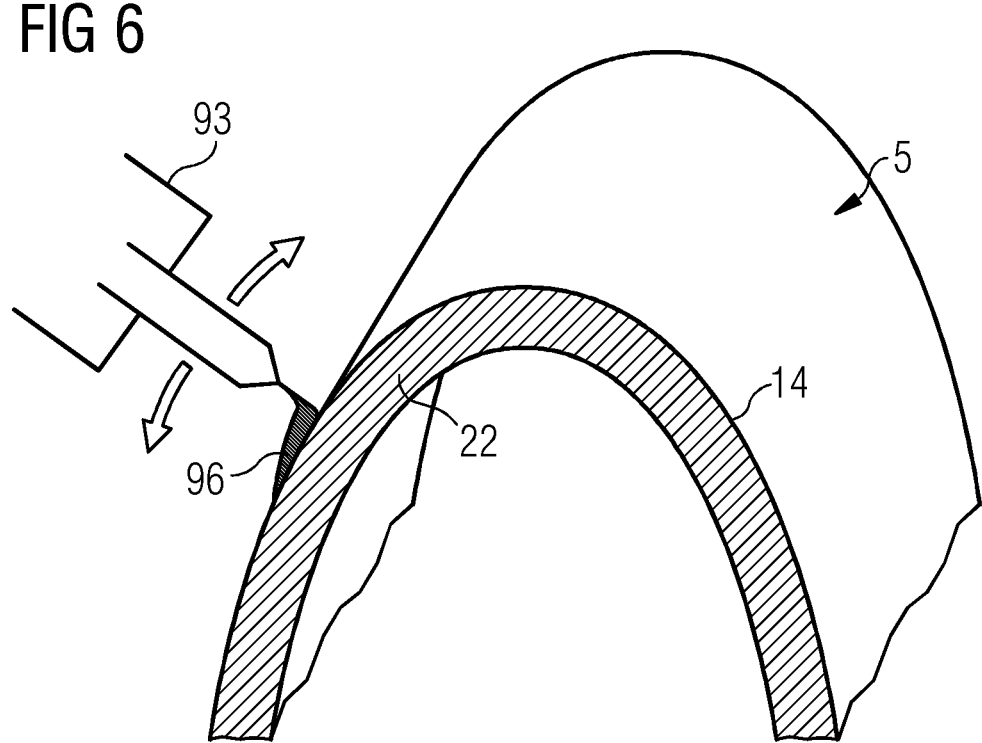
Figure 7:
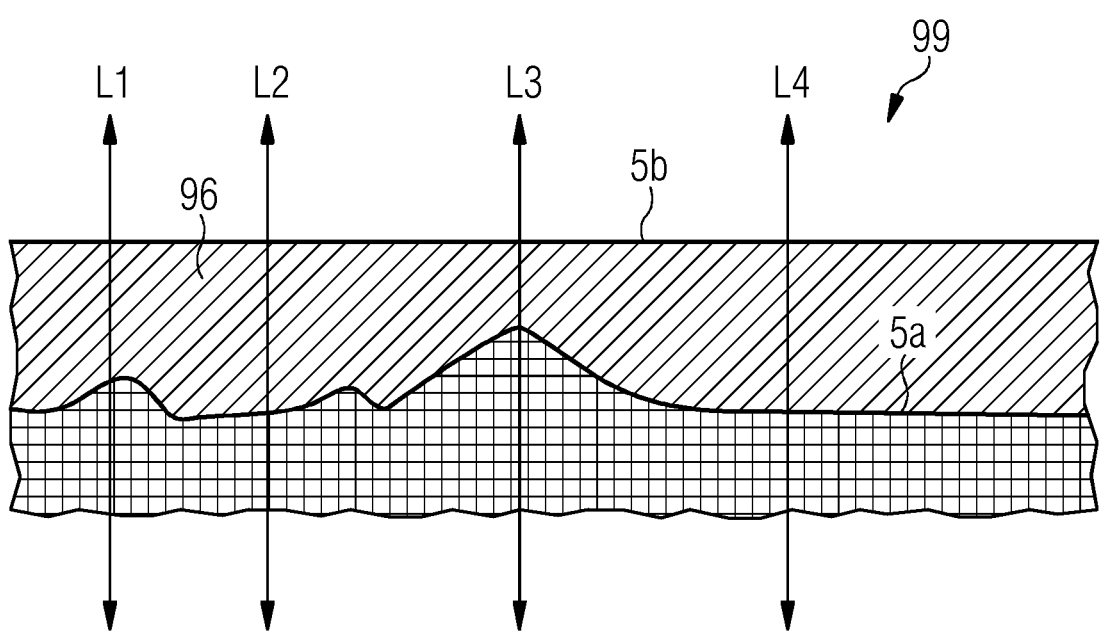
Figure 8:
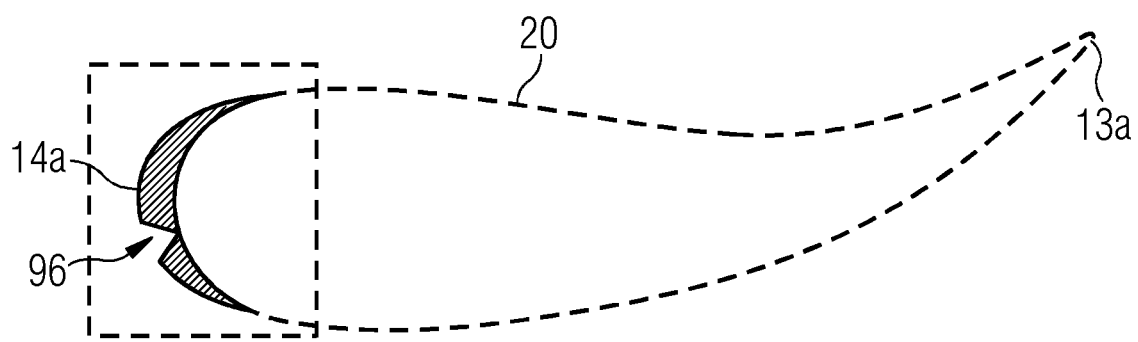
Figure 9:
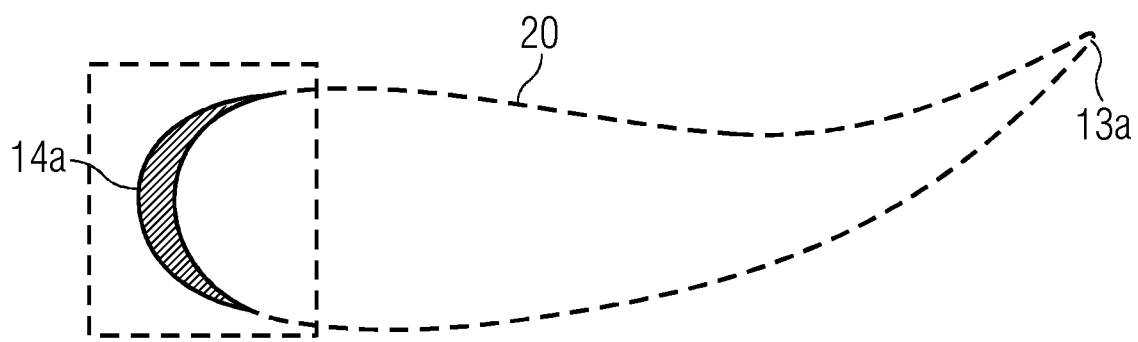
Figure 10:
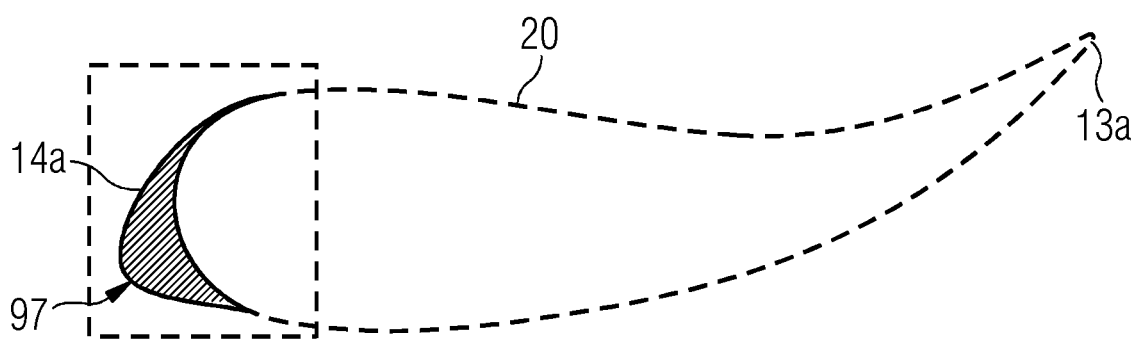

Some of the embodiments will be described in detail, with reference to the following figures, wherein like designations denote like members, wherein:

FIG. 1 schematically depicts a wind turbine having a wind turbine rotor blade to which a method for repairing according to the present technique is applied at the site of installation of the wind turbine and without removal of the component to be repaired from the wind turbine;

FIG. 2 schematically depicts the wind turbine rotor blade to which a method for repairing according to the present technique is applied;

FIG. 3 is a flow chart representing the method of the present technique;

FIG. 4 schematically depicts a leading-edge protective shell being repaired by the method of the present technique;

FIG. 5 schematically depicts the leading-edge protective shell of FIG. 4 repaired by the method of the present technique;

FIG. 6 schematically depicts the leading edge being repaired by the method of the present technique;

FIG. 7 schematically depicts a repair scheme used in the method of the present technique;

FIG. 8 schematically depicts in the boxed region a damaged leading-edge section and also depicts the remaining airfoil of the wind turbine blade in dotted line for ease of understanding;

FIG. 9 schematically depicts in the boxed region the leading-edge section of FIG. 8 after being restored to its native state and also depicts the remaining airfoil of the wind turbine blade in dotted line for ease of understanding; and FIG. 10 schematically depicts in the boxed region the leading-edge section of FIG. 8 after being restored to a modified state and also depicts the remaining airfoil of the wind turbine blade in dotted line for ease of understanding.

DETAILED DESCRIPTION

FIG. 1 shows an exemplary embodiment of a wind turbine 100 of the present technique. The wind turbine 100 includes a tower 120, which is mounted on a fundament (not shown). A nacelle 122 is mounted on top of the tower 120 and rotatable with regard to the tower 120 by means of a yaw angle adjustment mechanism 121 such as yaw bearings and yaw motors. The yaw angle adjustment mechanism 121 functions to rotate the nacelle 122 around a vertical axis (not shown) referred to as a yaw axis, which is aligned with the longitudinal extension of the tower 120. The yaw angle adjustment mechanism 121 rotates the nacelle 122 during operation of the wind turbine 100 to ensure that the nacelle 122 is appropriately aligned with the current wind direction to which the wind turbine 100 is subjected.

The wind turbine 100 further includes a rotor 110 having at least a rotor blade 10, and generally three rotor blades 10, although in the perspective view of FIG. 1 only two rotor blades 10 are visible. One of the rotor blades 10 is schematically depicted in FIG. 2. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 in order to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. Furthermore, a brake 126 is provided to stop the operation of the wind turbine 100 for example when the repair method of the present technique is being applied to the wind turbine or to reduce the rotational speed of the rotor 110 for instance in case of a very strong wind and/or in case of an emergency.

The wind turbine 100 further includes a control system 150 for operating the wind turbine 100 at desired operational parameters. The wind turbine 100 may further include different sensors for example a rotational speed sensor 143, a power sensor 144, angle sensors 142, etc. that provide inputs to the control mechanism 150 or other components of the wind turbine 100 to optimize operation of the wind turbine 100.

Furthermore as shown in FIG. 2, the rotor blade 10 includes a root section 11 having a root 11*a* and an airfoil section 20. Generally, the rotor blade 10 includes a transition section 90 in between the root section 11 and the airfoil section 20. The airfoil section 20, hereinafter also referred to as the airfoil 20, includes a tip section 12 having a tip 12*a*. The root 11*a* and the tip 12*a* are separated by a span 16, of the rotor blade 10, which follows the shape of the rotor blade 10. A direction along or parallel to the span 16 is referred to as span-wise direction. The tip section 12, including the tip 12*a* therein, extends from the tip 121 towards the root 11*a* up to a span-wise position of approximately 33.3% (percent), i.e. one third of the total length of the blade 10, as measured from the tip 12*a*. The tip 12*a* extends within the tip section 12 towards the root 11*a* up to a span-wise position of approx. one meter. The rotor blade 10 includes a leading-edge section 14 having a leading edge 14*a*, and a trailing edge section 13 having a trailing edge 13*a*. The trailing edge section 13 surrounds the trailing edge 13*a*. Similarly, the leading-edge section 14 surrounds the leading edge 14*a*. A protective shell (not shown in FIG. 2) may be mounted on the blade 10, especially around the leading edge 14*a*.

At each span-wise position perpendicular to the span 16, a chord line 17 that connects the leading edge 14*a* and the trailing edge 13*a* can be defined. A direction along or parallel to the chord line 17 is referred to as chord-wise direction. FIG. 2 depicts two such chord lines 17 at two different span-wise positions. Furthermore, a direction mutually perpendicular to the span-wise direction and to the chord-wise direction is referred to as a flap-wise direction. The rotor blade 10 has a shoulder 18 that is a section of the rotor blade 10 where the chord line 17 has maximum chord length, i.e. in example of FIG. 2 at the chord line 17 that is depicted towards the root 11*a*.

In the wind turbine 100, the blade 10 includes a blade shell. The blade 10 of the wind turbine 100 may have a 'butterfly blade' construction having leeward and windward shells that are separately manufactured and then joined together to form the blade 10 or may have the well-known 'integral blade' construction of Siemens, where unlike butterfly blade construction the leeward and windward shells are not separately manufactured. In the integral blade construction, the entire shell is manufactured in one-part as an integral shell and thus does not have a separately manufactured leeward and windward side. The shell has a surface 5 which is exposed to the outside environment.

FIG. 3 presents a flow chart of a method 1 for on-site repairing of a surface of a component, for example the surface 5 of the blade 10 of FIG. 2 or a surface 25 of a leading-edge protective shell 24 of FIG. 4, in a wind turbine, for example the wind turbine 100 of FIG. 1. FIG. 4 schematically represents the leading-edge protective shell 24 having the surface 25 that has been damaged or eroded. As shown in FIG. 4 the leading-edge protective shell 24 is positioned on the leading edge 14*a* during the performance of the method 1. In FIGS. 4 and 5 the blade 10 is shown in dotted line. A damaged region 99 is depicted in FIG. 4 on the surface 25 of the leading-edge protective shell 24, hereinafter also referred to as the LE shell 24.

To carry out the method 1 of the present technique, and as depicted schematically in FIG. 4, a system having a scanning device or a 3D scanner 91, a processor 92 and a 3D printing arrangement 95 is used. The 3D printing arrangement 95, hereinafter also referred to as the 3D printer 95, includes a 3D printing head 93 configured to deposit one or more materials 96 on the damaged region 99 and a positioning mechanism 94 configured to move and position the 3D printing head 93 over different locations of the surface 5,25. The one or more materials 96 deposited by the 3D printing head 93 may be reactive materials 96 or thermoplastic material 96. The reactive materials 96 are materials that are dispensed by the 3D printing head 93, hereinafter also referred to as the head 93, onto the surface 5,25 and as a result of mixing of the materials 96 on the surface 5,25 a physical or chemical reaction is generated which form a solidified product in-situ in the damaged region 99 of the surface 5,25. Examples of such reactive materials 96 used in the present method 1 are heat or radiation curing acrylic resins, epoxy resins, polyester resins or polyurethane resins or mixtures thereof. The reactive materials 96 are applied as liquid and the reaction is triggered during or right after application by an external stimulus to form a thermoplastic or thermoset polymer on the surface 25. Alternatively thermoplastic materials 96 such as Thermoplastic elastomers (TPEs), Thermoplastic polyurethanes (TPUs) are used to in the method 1 which when deposited by the head 93 are molten and applied as a liquid and then solidify by cooling on the surface 5,25. The positing mechanism 94 moves and positions the head 93 over the surface 5,25, and may be for example a robotic arm mounted on a crane or a cable drive. Individually, such positing mechanism 94 and also 3D scanner 91 and head 93 are known in the art of 3D printing and thus not explained herein in further details for sake of brevity.

Referring now to FIG. 3 in combination with FIGS. 4 to 10, the method 1 has been explained further. FIG. 4 shows a damaged LE protective shell 24 being repaired by the method 1 of the present technique and FIG. 6 shows the leading-edge section 14 of the blade 10 that is being repaired by the method 1 of the present technique.

In the method 1, in a step 30 a digital model of the surface 5, 25 of the component, i.e. the LE protective shell 24 or the leading edge section 14 of the blade 10, that is to be repaired is generated by using the scanning device 91. The digital model is a 3D dataset that maps features of the surface 5, 25. The digital model so created represents the surface 5, 25 in damaged state, as shown particularly in FIGS. 4 and 8, i.e. includes the representation of the damaged region 99 and location of the damaged region 99, thus in the step 30 are included a step 32 of scanning of the surface 5, 25 and a step 34 of mapping of the surface 5, 25—both performed by the by the scanning device 91. Thereafter, in a step 40 of the method 1 a repair scheme for the surface 5, 25 is generated using the processor 92. The repair scheme is generated by comparing the digital model generated in step 30 with a desired state of the surface 5, 25 of the LE protective shell 24 or the leading-edge section 14 that is being repaired. The desired state is also a digital 3D model or dataset that represents a post-repair state of the surface 5, 25 without the damaged region 99. In the step 40 by comparing the desired state with the digital model, the processor determines a set of locations on the surface 5, 25 which represent the damaged region 99 and also determines how much material 96 has to be deposited at each of these locations to transform the damaged region 99 so as to be eliminated, by filling with the material 96, from the surface 5, 25.

In general in the method 1, the desired state may be a native state or a modified state of the surface 5, 25. The native state is the state of the surface 5, 25 which is considered to be normal or undamaged state for example a state of the surface 5, 25 at the time of the installation or manufacturing of the component 10, 24. FIG. 5 schematically represents the native state for the LE protective shell 24, whereas FIG. 8 schematically represents the native state for the leading edge region 24 of the blade 10. When the surface 5, 25 with the damaged region 99 is transformed by deposition of the material 96 into the native state, the component 10, 24 is in the same or similar structural state as it was before starting its operation life time. The modified state on the other hand is a state of the surface 5, 25 of the component 10, 24 that represents a state where some additional structural element or feature has been added to the surface 5, 25 so as to reduce or eliminate the effects of damage or to enhance certain properties of the component 10, 24 for example modifying the surface 5, 25 for increased aerodynamic properties. FIG. 10 schematically depicts a modified state for the leading-edge section 14 of the blade 10 in which a feature 97 has been added to the leading edge section 14 to enhance the aerodynamic performance of the wind turbine blade 10. The desired state i.e. the native state or the modified state of the surface 5, 25 may be predetermined by using an external means, such as an external processor and associated design algorithm. Alternatively, the desired state may be generated by the processor 92 from the digital model and using shape correction algorithms and design models.

In the method 1, after the step 40 is a step 50 in which the repair scheme is provided to the 3D printing arrangement 95. Thereafter, in a final step 60 of the method 1, one or more selected materials 96 are printed, using the 3D printing arrangement 95, on the surface 25 to be repaired. The printing is performed according the repair scheme. The positioning mechanism moves and positions the head 93 at different locations as per the repair scheme and the head 93 deposits various amounts, as per the repair scheme, of the one or more materials 96 at these different locations. Thus, the method 1 can be autonomously performed by the system using the scanning device 91, processor 92, head 93, the positioning mechanism 94 and the one or more materials 96. It may be noted that the one or more materials 96 are selected based on the material of the surface 5, 25 of the component 10, 24 i.e. for example the constituent materials of the shell 22 of the blade 10 or the constituent materials of the LE protective shell 24. FIG. 5 shows the repaired LE protective shell 24 when restored to its native state by the method 1 of the present technique.

FIG. 7 schematically represents an exemplary embodiment of the repair scheme that is generated in the step 40 of the method 1 for repair of the leading-edge section 14. It may be noted that the repair scheme for repair of any other component such as the LE protective shell 24 will be similarly generated. The repair scheme indicates a plurality of locations of the surface 5, and especially within the damaged region 99. In the example of FIG. 7 four such locations L1, L2, L3 and L4 all in the damaged region 99 are depicted, however more such locations within the damaged region 99 and outside of the damaged region on the surface 5 will be present in the repair scheme in practice. The repair scheme shows a surface 5a that is the part of the surface 5 in the damaged region as determined from the digital model of step 30. The repair scheme also shows a surface 5b that is the part of the surface 5 as it is desired to be post repair as determined from the desired state. The repair scheme thus by comparing the surfaces 5a and 5b and mutually mapping them with each other determines an amount of the material 96 that is to be deposited by the head 93 at each of the locations, for example the repair scheme shown in FIG. 7 includes the information that more amount of the material 96 is to be deposited at the locations L2 and L4 and less amount of the material 96 is to be deposited at the location L1 and an even lesser amount of the material 96 is to be deposited at the location L3. It may be noted that the amount of the material 96 to be deposited at the different locations L1, L2, L3 and L4 may be indicated in the repair scheme in comparative terms or in absolute terms.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for on-site repairing of a surface of a component in a wind turbine, the method comprising:
    generating a digital model of the surface of the component to be repaired by using a scanning device, wherein the digital model represents the surface in damaged state;
    generating, by a processor, a repair scheme for the surface based on the digital model and on a desired state of the surface of the component, wherein the desired state represents a post-repair state of the surface of the component;
    providing the repair scheme to a 3D printing arrangement; and
    printing with one or more selected materials, using the 3D printing arrangement, on the surface to be repaired, wherein the printing is performed according the repair scheme;
    wherein the component is one of a leading-edge section of a blade of the wind turbine and a leading-edge protective shell attached to the leading-edge section of the blade of the wind turbine, and
    wherein the desired state of the surface of the component is a modified state of the surface of the one of the leading-edge section and the leading-edge protective shell attached to the leading-edge section, wherein the modified state of the surface of the one of the leading-edge section and the leading-edge protective shell attached to the leading-edge section is different from a native state of the surface of the one of the leading-edge section and the leading-edge protective shell attached to the leading-edge section, wherein the native state is a state of the surface at installation of the component, and wherein the modified state has different aerodynamic properties compared to the native state.

2. The method according to claim 1, wherein generating the digital model of the surface of the component comprises:
    scanning the surface of the component; and
    mapping the surface of the component.

3. The method according to claim 1, wherein the native state is provided to the processor by an external means.

4. The method according to claim 1, wherein the modified state is generated by the processor or provided to the processor by an external means.

5. The method according to claim 1, wherein the 3D printing arrangement prints using reactive materials or one or more thermoplastic materials.

6. The method according to claim 1, wherein the 3D printing arrangement comprises a 3D printing head and a positioning mechanism configured to position the 3D printing head over the surface of the component in the wind turbine.

* * * * *